United States Patent
Fatemi et al.

(10) Patent No.: US 10,382,140 B2
(45) Date of Patent: Aug. 13, 2019

(54) OPTICAL SPARSE PHASED ARRAY RECEIVER

(71) Applicant: California Institute of Technology, Pasadena, CA (US)

(72) Inventors: Seyed Mohammadreza Fatemi, Pasadena, CA (US); Seyed Ali Hajimiri, La Canada, CA (US); Behrooz Abiri, Alhambra, CA (US); Aroutin Khachaturian, Glendale, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/616,844

(22) Filed: Jun. 7, 2017

(65) Prior Publication Data
US 2018/0123699 A1    May 3, 2018

Related U.S. Application Data (60) Provisional application No. 62/346,929, filed on Jun. 7, 2016, provisional application No. 62/346,966, filed on Jun. 7, 2016.

(51) Int. Cl.

| | | |
|---|---|---|
| *G01S 3/782* | (2006.01) | |
| *G01S 3/785* | (2006.01) | |
| *H04B 10/11* | (2013.01) | |
| *H04B 10/60* | (2013.01) | |
| *H04B 10/61* | (2013.01) | |

(Continued)

(52) U.S. Cl.
CPC ........... *H04B 10/613* (2013.01); *G01S 3/782* (2013.01); *G01S 3/785* (2013.01); *H04B 10/11* (2013.01); *H04B 10/616* (2013.01); *H04B 10/40* (2013.01); *H04B 10/50* (2013.01); *H04B 10/504* (2013.01); *H04B 10/60* (2013.01); *H04B 10/673* (2013.01); *H04B 10/674* (2013.01)

(58) Field of Classification Search
None
See application file for complete search history.

(56) References Cited

U.S. PATENT DOCUMENTS

| 4,686,533 A | 8/1987 | MacDonald et al. |
|---|---|---|
| 4,833,336 A | 5/1989 | Kraske |

(Continued)

FOREIGN PATENT DOCUMENTS

| WO | WO 2018/148758 A1 | 8/2018 |
|---|---|---|
| WO | WO 2018/165633 A1 | 9/2018 |

OTHER PUBLICATIONS

Bliss, et al., "Multiple-Input Multiple-Output (MIMO) Radar and Imaging: Degrees of Freedom and Resolution," *Signals, Systems, and Computers (Asilomar) Conference*, pp. 54-59, (2003).

(Continued)

*Primary Examiner* — Darren E Wolf
(74) *Attorney, Agent, or Firm* — Alston & Bird LLP (57) ABSTRACT

A sparse optical phased array transmitter/receiver includes, in part, a multitude of transmitting/receiving elements that are sparsely positioned. Accordingly, the transmitting/receiving elements are not uniformly distributed at equal distance intervals along a one-dimensional, two-dimensional, or a three-dimensional array. The positions of the transmitting/receiving elements may or may not conform to an ordered pattern.

34 Claims, 8 Drawing Sheets

(51) Int. Cl.
*H04B 10/67* (2013.01)
*H04B 10/40* (2013.01)
*H04B 10/50* (2013.01)

(56) References Cited

U.S. PATENT DOCUMENTS

| | | | |
|---|---|---|---|
| 6,424,442 B1 | 7/2002 | Gfeller et al. | |
| 6,894,550 B2 | 5/2005 | Trosa et al. | |
| 8,311,417 B1* | 11/2012 | Poggiolini | H04B 10/611 |
| | | | 398/147 |
| 9,325,419 B1 | 4/2016 | Kato | |
| 2002/0174660 A1 | 11/2002 | Venkatasubramanian | |
| 2003/0090775 A1 | 5/2003 | Webb et al. | |
| 2004/0071386 A1 | 4/2004 | Nunen et al. | |
| 2004/0101227 A1 | 5/2004 | Takabayashi et al. | |
| 2004/0141753 A1 | 7/2004 | Andreu-von Euw et al. | |
| 2005/0138934 A1 | 6/2005 | Weigert et al. | |
| 2006/0056845 A1 | 3/2006 | Parsons et al. | |
| 2008/0111755 A1 | 5/2008 | Haziza et al. | |
| 2008/0181550 A1 | 7/2008 | Earnshaw | |
| 2010/0158521 A1* | 6/2010 | Doerr | H04B 10/61 |
| | | | 398/65 |
| 2010/0226658 A1 | 9/2010 | Fujimoto et al. | |
| 2011/0064415 A1 | 3/2011 | Williams et al. | |
| 2012/0207428 A1 | 8/2012 | Roelkens | |
| 2012/0213531 A1 | 8/2012 | Nazarathy et al. | |
| 2015/0009068 A1 | 1/2015 | Gregoire et al. | |
| 2015/0198713 A1 | 7/2015 | Boufounos et al. | |
| 2015/0336097 A1 | 11/2015 | Wang et al. | |
| 2015/0357710 A1 | 12/2015 | Li et al. | |
| 2016/0170141 A1 | 6/2016 | Luo et al. | |
| 2016/0172767 A1 | 6/2016 | Ray | |
| 2016/0266414 A1 | 9/2016 | Gill et al. | |
| 2017/0041068 A1* | 2/2017 | Murakowski | H04B 10/11 |
| 2017/0324162 A1 | 11/2017 | Khachaturian et al. | |
| 2018/0101032 A1 | 4/2018 | Aflatouni et al. | |
| 2018/0101083 A1 | 4/2018 | Aflatouni et al. | |

OTHER PUBLICATIONS

Bogaerts, et al., "Low-loss, low-cross-talk crossings for silicon-on-insulator nanophotonic waveguides," *Optics Letters*, 32(19): 2801-2803, (2007).
Katz, et al., "Diffraction coupled phase-locked semiconductor laser array," *Appl. Phys. Lett.*, 42(7): 554-556, (1983).
Liang, et al., "Tiled-aperture coherent beam combining using optical phase-lock loops," *Electronics Letters*, 44(14), (2008).
Resler, et al., "High-efficiency liquid-crystal optical phased-array beam steering," *Opt. Lett.*, 21(9): 689-691, (1996).
Vaidyanathan, et al., "Sparse sensing with coprime arrays," *Signals, Systems, and Computers (Asilomar) Conference*, pp. 1405-1409, (2010).
U.S. Appl. No. 15/728,329, Non-Final Office Action dated Jan. 19, 2018.
U.S. Appl. No. 15/728,329, Response to Final Office Action filed Jan. 16, 2019.
U.S. Appl. No. 15/587,391, Non-Final Office Action dated Dec. 13, 2018.
WIPO Application No. PCT/US2018/018070, PCT International Search Report and Written Opinion of the International Searching Authority dated Apr. 27, 2018.
WIPO Application No. PCT/US2018/021882, PCT International Search Report and Written Opinion of the International Searching Authority dated Jun. 7, 2018.
U.S. Appl. No. 15/728,329, Final Office Action dated Aug. 3, 2018.
U.S. Appl. No. 15/728,329, Response to Non-Final Office Action filed Jul. 18, 2018.

* cited by examiner

OPTICAL SPARSE PHASED ARRAY RECEIVER

CROSS REFERENCE TO RELATED APPLICATIONS

The present application claims benefit under 35 USC 119(e) of Application Ser. No. 62/346,929, filed Jun. 7, 2016, and Application Ser. No. 62/346,966, filed Jun. 7, 2016, the contents of both of which are incorporated herein by reference in their entirety.

FIELD OF THE INVENTION

The present invention relates to silicon photonics, and more particularly to optical phased arrays.

BACKGROUND OF THE INVENTION

Optical phased array receivers are used in detecting light arriving from a given direction. Optical phased array transmitters are used in shaping and steering a narrow, low-divergence, beam of light over a relatively wide angle. An integrated optical phased array photonics chip often includes a number of components such as lasers, photodiodes, optical modulators, optical interconnects, transmitters and receivers.

Optical phased arrays have been used in 3D imaging, mapping, ranging remote sensing, actuation projection system, data communication, and other emerging technologies such as autonomous cars and drone navigation. A need continues to exist for improvements to optical phased arrays.

BRIEF SUMMARY OF THE INVENTION

A sparse optical phased array receiver includes, in part, a multitude of receiving elements that are sparsely positioned. The receiving elements are not uniformly distributed at equal distance intervals along a one-dimensional, two-dimensional, or a three-dimensional array. In one embodiment, the positions of the receiving elements are selected so as not to follow an ordered pattern yet are optimized to achieve the desired beam characteristics. In one embodiment, the positions of the receiving elements are selected to provide an ordered pattern.

In one embodiment, the sparse optical phased array receiver further includes, in part, a multitude of phase shifters each adapted to shift a phase of an optical signal received from a different one of the multitude of receiving elements. In one embodiment, the sparse optical phased array receiver further includes, in part, a multitude of amplitude modulators each adapted to modulate an amplitude of the optical signal received from a different one of the multitude of receiving elements.

In one embodiment, the sparse optical phased array receiver further includes, in part, a combiner adapted to receive and combine the multitude of phase-shifted and amplitude-modulated signals. In one embodiment, the sparse optical phased array receiver further includes, in part, a photo-diode adapted to convert the output signal of the combiner to an electrical signal. In one embodiment, the sparse optical phased array receiver further includes, in part, a signal processing block adapted to receive and mix a reference light with the multitude of phase-shifted and amplitude-modulated signals. In one embodiment, the sparse optical phased array receiver further includes, in part, a phase shifter adapted to shift the phase of a reference optical signal. In one embodiment, the sparse optical phased array receiver further includes, in part, an amplitude modulator adapted to modulate an amplitude of the reference optical signal.

A method of detecting the direction of an incident light, in accordance with one embodiment of the present invention, includes, in part, receiving the light via a multitude of receiving elements that are sparsely positioned. The receiving elements are not uniformly distributed at equal distance intervals along a one-dimensional, two-dimensional, or a three-dimensional array. In one embodiment, the method further includes, in part, selecting the positions of the receiving elements such that the positions do not follow an ordered pattern yet are optimized to achieve the desired beam characteristics. In one embodiment, the method further includes, in part, selecting the positions of the receiving elements to provide an ordered pattern.

In one embodiment, the method further includes, in part, shifting the phases of the optical signals received from at least a first subset of the multitude of receiving elements. In one embodiment, the method further includes, in part, modulating the amplitudes of the optical signals received from at least a second subset of the plurality of receiving elements. In one embodiment, the method further includes, in part, combining the phase-shifted and amplitude-modulated signals to generate a combined signal.

In one embodiment, the method further includes, in part, converting the combined signal to an electrical signal. In one embodiment, the method further includes, in part, mixing a reference light with the phase-shifted and amplitude-modulated signals. In one embodiment, the method further includes, in part, shifting the phase of the reference optical signal. In one embodiment, the method further includes, in part, modulating the amplitude of the reference optical signal.

A sparse optical phased array transmitter, in accordance with one embodiment of the present invention include, in part, a multitude of transmitting elements that are sparsely positioned. The transmitting elements are not uniformly distributed at equal distance intervals along a one-dimensional, two-dimensional, or a three-dimensional array. In one embodiment, the positions of the transmitting elements are selected so as not to follow an ordered pattern yet are optimized to achieve the desired beam characteristics. In one embodiment, the positions of the transmitting elements are selected so as to provide an ordered pattern.

In one embodiment, the sparse optical phased array transmitter further includes, in part, a multitude of phase shifters each adapted to shift the phase of a different one of a multitude of incoming optical signals. In one embodiment, the sparse optical phased array transmitter further includes, in part, a multitude of amplitude modulators each adapted to modulate the amplitude of a different one of the multitude of incoming optical signals. In one embodiment, the sparse optical phased array transmitter further includes, in part, a splitter adapted to generate the multitude of incoming optical signals.

In one embodiment, the sparse optical phased array transmitter further includes, in part, a phase shifter adapted to shift the phase of an input optical signal to generate the incoming optical signal. In one embodiment, the sparse optical phased array transmitter further includes, in part, an amplitude modulator adapted to modulate the phase of the input optical signal to generate the incoming optical signal. In one embodiment, the input optical signal is generated by a laser. In one embodiment, the phase shifter may be a thermal phase shifter, a PIN diode modulator, or a ring resonator.

A method of transmitting light along a first direction, in accordance with one embodiment of the present invention, includes, in part, transmitting the light via a multitude of transmitting elements that are sparsely positioned. The transmitting elements are not uniformly distributed at equal distance intervals along a one-dimensional, two-dimensional, or a three-dimensional array. In accordance with one embodiment, the method further includes, in part, selecting the positions of the transmitting elements such that the positions do not to follow an ordered pattern yet are optimized to achieve the desired beam characteristics. In accordance with one embodiment, the method further includes, in part, selecting the positions of the transmitting elements so as to achieve an ordered pattern.

In accordance with one embodiment, the method further includes, in part, shifting the phases of at least a first subset of a multitude of incoming optical signals. In accordance with one embodiment, the method further includes, in part, modulating the amplitudes of least a second subset of the multitude of incoming optical signals. In accordance with one embodiment, the method further includes, in part, splitting a first optical signal to generate the multitude of incoming optical signals. In accordance with one embodiment, the method further includes, in part, shifting the phase of an input optical signal to generate the first optical signal. In accordance with one embodiment, the method further includes, in part, modulating the amplitude of the input optical signal to generate the first optical signal. In one embodiment, the input optical signal is generated by a laser. In one embodiment, the phase shifting is performed by a phase shifter that may be a thermal phase shifter, a PIN diode modulator, or a ring resonator.

DETAILED DESCRIPTION OF THE INVENTION

Embodiments of the present invention include a sparse optical phased array transmitter (hereinafter alternatively referred to as "sparse transmitter" or "transmitter") and/or a sparse optical phased array receiver (hereinafter alternatively referred to as "sparse receiver" or "receiver"). The transmitter and receiver are adapted to operate either independently or in coordination with one another to form a transceiver.

The sparsity of the receiver and/or transmitter array elements is used to provide flexibility and enhance optical routing, thereby improving performance. The sparsity also increases the receiver and/or transmitter aperture size compared to a uniformly arranged and distributed array of receiving and/or transmitting elements. Consequently, in accordance with the embodiments of the present invention, the beam-width, the magnitude of side lobes, grating lobes, and other characteristics of the beam may be controlled and modified to further enhance performance of the phased array receiver and/or transmitter. It is understood that all descriptions of the exemplary embodiments of the present invention provided below with reference to sparse phased array receivers are equally apply to sparse transmitters.

An optical phased array receiver captures the incident light by its aperture—formed using an array of receiving elements—and processes it to determine, among other things, the direction of the incident light, or to look at the light coming from specific points or directions and suppress light from other points and directions. The array elements of an optical phased array receiver and/or transmitter, in accordance with the embodiments of the present invention, are not uniformly distributed and thus form a sparse array. The array elements may thus be positioned anywhere within the phased array aperture either in an arbitrary or according to one or more placement rules.

Figure 1A:
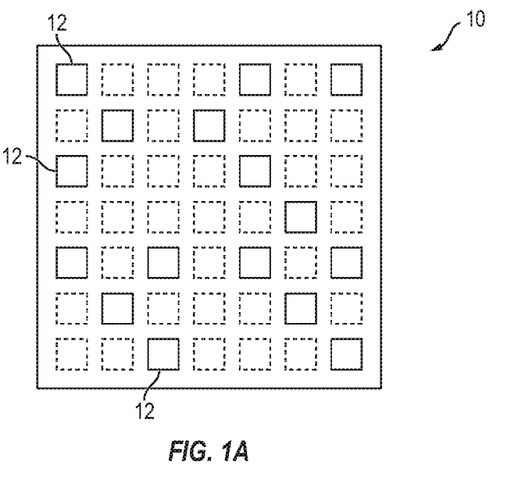
FIG. 1A is a simplified schematic diagram of a two-dimensional sparse optical phased array transmitter/receiver, in accordance with one exemplary embodiment of the present invention
Figure 1B:
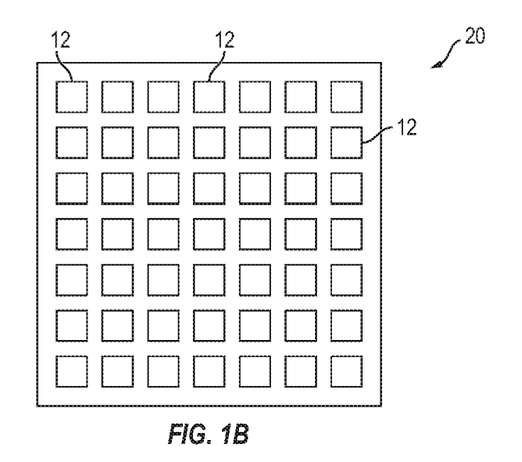
FIG. 1B is a simplified schematic diagram of an optical phased array transmitter/receiver, as known in the prior art.

FIG. 1A is a simplified schematic diagram of a two-dimensional sparse optical phased array receiver 10, in accordance with one exemplary embodiment of the present invention. Sparse receiver 10 is shown as including sixteen receiving elements 12 that are sparsely positioned. For comparison, FIG. 1B is a schematic diagram of a two-dimensional optical phased array receiver 20 in which receiving elements 12 are uniformly distributed to form a 7×7 array, as known in the prior art. As seen from FIG. 1A, although sparsely populated, the receiving elements 12 remain on row and column grids. Elements identified in FIG. 1A with dotted lines are the elements that are present in conventional array receiver 20 of FIG. 1B but not present in array receiver 10 of FIG. 1A. Each receiving element 12 is adapted to receive and deliver an optical signal to, for example, a waveguide. An array element may be a grating coupler, an electromagnetic diffractive mode coupler, an edge coupler, a plasmonic element, multi-layer diffractive mode coupler, and the like. Although the description of FIG. 1A is made with reference to sparse phased array 10 being a sparse phased array receiver, it is understood that sparse phased array 10 may equally be a sparse phased array transmitter in which case each element 12 is a transmitting element.

Figure 1C:
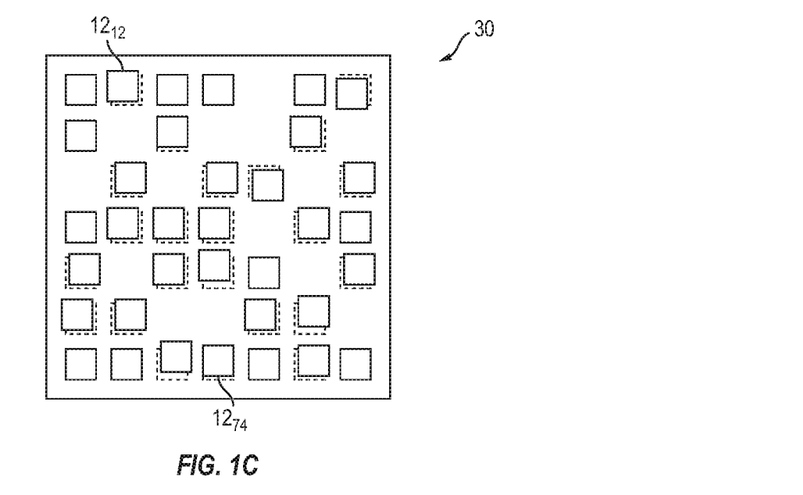
FIG. 1C is a simplified schematic diagram of a two-dimensional sparse optical phased array transmitter/receiver, in accordance with another exemplary embodiment of the present invention.

FIG. 1C is a simplified schematic diagram of a two-dimensional sparse optical phased array receiver 30, in accordance with another exemplary embodiment of the present invention. The dotted lines in FIG. 1C identify the grid positions within each array row and columns. As is seen, a number of elements of array 30 are off-grid. For example, receiving element 1212, where the first and second indices of reference number 12 respectively identify the row and column number of the receiving element, is shown as being off both the column and row grids. Likewise, receiving element 1274 is shown as being off the row grid. Although the description of FIG. 1C is made with reference to sparse phased array 30 being a sparse phased array receiver, it is understood that sparse phased array 30 may equally be a sparse phased array transmitter.

A sparse optical phased receiver and/or transmitter array, in accordance with embodiments of the present invention, provides extra space for routing of optical signals to and from the receiving and/or transmitting elements of the array. Consequently, a significantly larger number of such elements may be placed in the array to improve performance. In one embodiment, the locations of the array elements may be selected arbitrarily (as shown for example in FIG. 1A) while satisfying one or more predefined conditions to achieve optimization, such as achieving a selected beam with or side lobe levels. In yet another embodiment, the locations of the array elements are determined in accordance with a placement algorithm, thereby resulting in an ordered pattern of the elements, as shown in array 40 of FIG. 1D described further below. FIG. 1E is a schematic diagram of a two-dimensional optical phased array transmitter/receiver 50 in which transmitting/receiving elements 12 are distributed uniformly to form a 12×12 array, as known in the prior art.

A one-dimensional ordered pattern of a sparse optical phase array receiver/transmitter, in accordance with one embodiment of the present invention, includes an array of element whose locations along the x-direction may be defined as follows:

$$X = m*M + n*N \quad (1)$$

where M and N are co-prime numbers, and where 0≤m<N and 0≤n<M.

The number of array elements in such embodiments is M*N, and the length L of the array along the x-axis is defined by the following expression:

$$L = (N-1)*M + (M-1)*N \quad (2)$$

To form a two-dimensional ordered pattern of sparse optical phase array, in accordance with an embodiment of the present invention, another set of co-prime numbers, M' and N', are selected (M' and N' may be the same as M and N). This results in the repeated placement of the one-dimensional array as defined in expressions (1) and (2) above, along the required number of row.

Figure 1D:
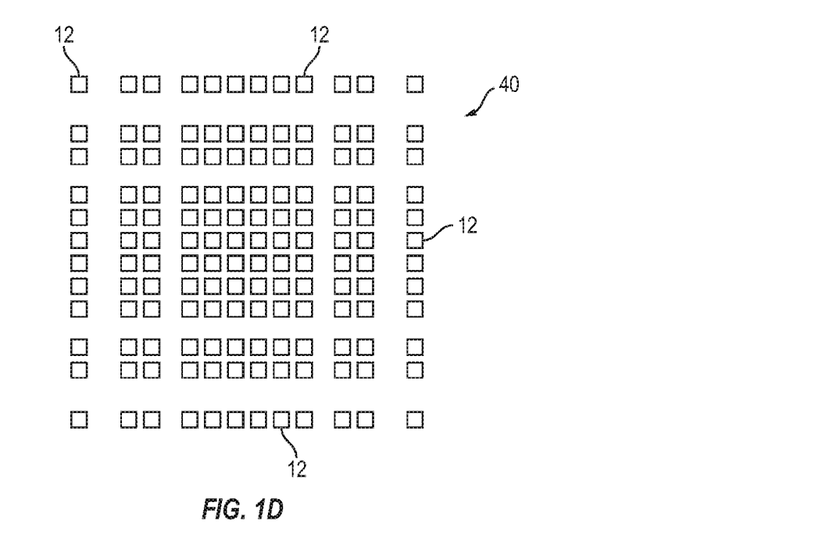
FIG. 1D is a schematic diagram of a two-dimensional sparse optical phased array transmitter/receiver, in accordance with another exemplary embodiment of the present invention.
Figure 1E:
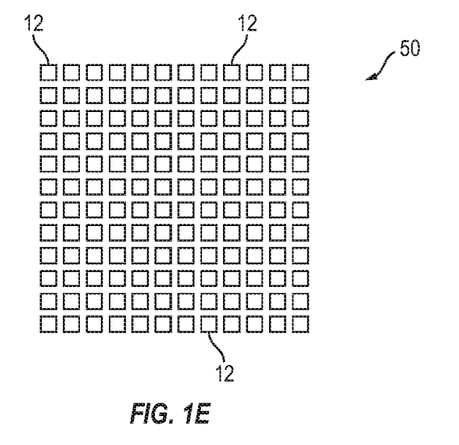
FIG. 1E is a schematic diagram of an optical phased array transmitter/receiver, as known in the prior art.

In the exemplary array 40 shown in FIG. 1D, parameters M and M' are set to 3 and parameters N and N' are set to 4. Conventional array 50 of FIG. 1E is a uniformly distributed array having the same number of elements as array 40. As is readily seen by comparing FIGS. 1D and 1E, array 40 has a larger aperture, more space for optical routing, and improved performance compared to array 50. It is understood that any technique or placement algorithm that generates a sparse but ordered array of elements may be used to form a one-dimensional, two-dimensional, or three-dimensional sparse array, in accordance with the embodiments of the present invention. For example, a three-dimensional array may be formed by forming an array of an array of an array.

Figure 2:
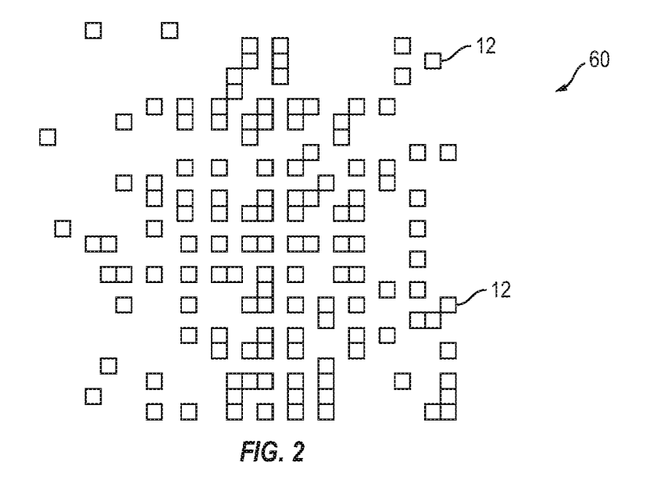
FIG. 2 is a schematic diagram of a sparse optical phase sparse transmitter/receiver, in accordance with another exemplary embodiment of the present invention.

FIG. 2 shows an exemplary sparse array 60 having 128 elements that are placed in positions that do not follow or conform to an ordered patterned, in accordance with another exemplary embodiment of the present invention, yet the positions are selected in accordance with an optimization scheme so as to achieve the desired beam characteristics. Such arrays provide extra degrees of freedom in selecting the element locations. One technique for forming array 60 is to start with a corresponding uniformly distributed array, which in this case is a two-dimensional array of uniformly distributed 25×25 elements (see, for example, the 15×15 array shown in FIG. 1E), and apply an optimization algorithm to decide which elements of the array to keep and which ones to remove in order to achieve the desired array characteristics such as the beam width, side lobe levels, routing availability, and the like.

Figure 3A:
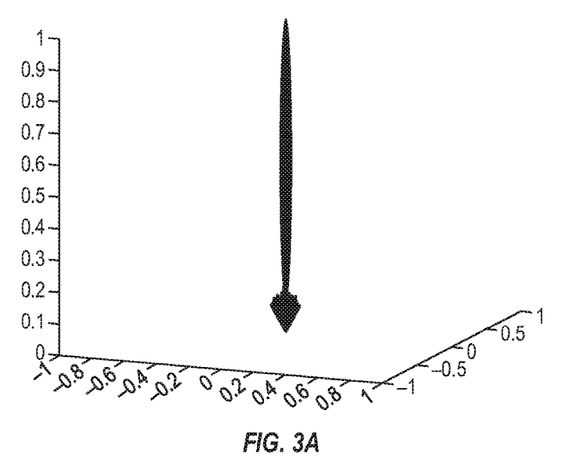
FIG. 3A shows a far field pattern of the optical phased array of FIG. 2.
Figure 3B:
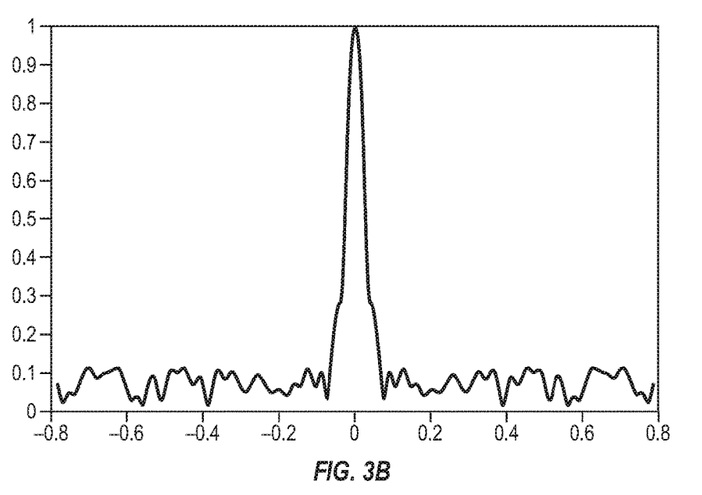
FIG. 3B shows a cross-section of the far field of FIG. 3A along the x-axis.
Figure 4:
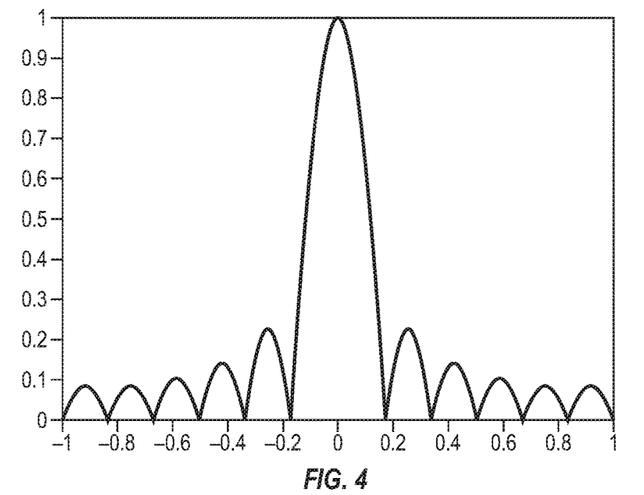
FIG. 4 is a cross-section along the x-axis of the far field pattern of a conventional phased array having uniformly distributed array of elements, as known in the prior art.

FIG. 3A shows an exemplary far field pattern of array 60 of FIG. 2. FIG. 3B is a cross-section along the x-axis of the far field pattern shown in FIG. 3A. FIG. 4 is a cross-section along the x-axis of the far field pattern of a corresponding conventional phased array having a uniformly distributed array of 25×25 (not shown) elements. By comparing the field patterns shown in FIGS. 3B and 4A, it is seen that array 60 of FIG. 2 has a narrower beam width and smaller side-lobe levels relative to a conventional corresponding array having 25×25 elements.

Figure 5:
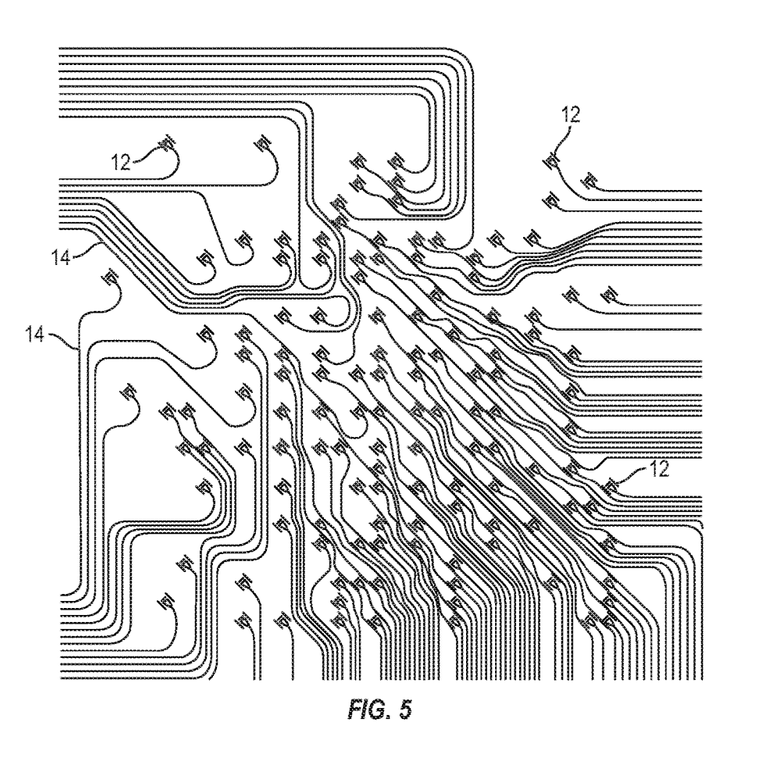
FIG. 5 is a top layout view of the sparse optical phased array transmitter/receiver of FIG. 2, in accordance with another embodiment of the present invention.

FIG. 5 is a top layout view of phased array transmitter/receiver array 60 shown in FIG. 2. As is seen from this layout, because the array elements, which may be diffracting mode couplers, 12 are sparsely populated, the array advantageously provides more space for routing of the signal paths which may be dielectric waveguides. As was described above, the optimization process for selecting the elements that are kept from a corresponding uniformly distributed array of 25×12 elements, takes into account the routing for each array element. In this exemplary embodiment of the phased array, it is assumed that only a single layer is available for routing of the optical signals. However, it is understood that more than one routing layer may be used for delivering the optical signals to or from the array elements.

Figure 6:
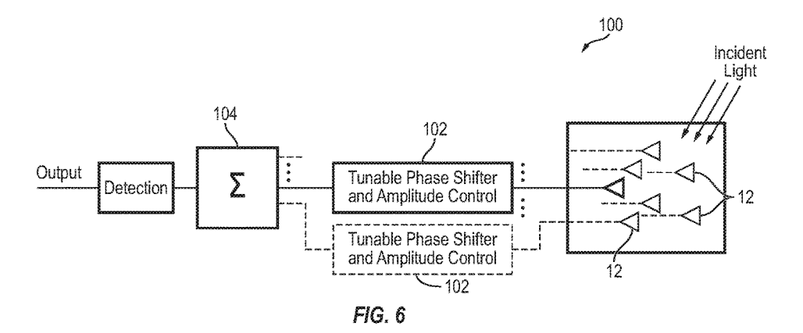
FIG. 6 is a high-level simplified block diagram of a number of components of a sparse optical phased array receiver, in accordance with one exemplary embodiment of the present invention.

FIG. 6 is a high-level simplified block diagram of a number of components of a sparse optical phased array receiver 100 adapted to process the received light and extract the desired information, such as the direction of the incident light, in accordance with one exemplary embodiment of the present invention. Associated with each receiving element 12 is a tunable phase and amplitude control block 102 adapted to control and vary the phase and/or the amplitude of the light received by its associated receiving element 12. The output signals of the tunable phase and amplitude control blocks 102 are combined optically using combiner 104 and then converted to an electrical signal by detecting unit 106. By varying the phases and/or amplitudes of the light received by the arrays of receiving elements, the light components arriving from any given direction or points are preserved at the output of detection unit 106, whereas the light components arriving from other directions or points are suppressed. Therefore, by modulating the phases and/or amplitudes using blocks 102, only the information representative of the light coming from any given direction or point is generated at the output of detection unit 106.

In one embodiment, a Mach-Zehnder modulator is used in each block 102 to control and vary the amplitude of the light received from the block's associated receiving element. It is understood that amplitude control and modulation may be performed using any one of a number of known devices and techniques, such as absorption modulators, PIN diodes and the like. In one embodiment, a Mach-Zehnder modulator is used in each block 102 to modulate and vary the phase of the light received from the block's associated receiving element. It is understood that phase modulation and control may be achieved using any one of a number of known devices and techniques such as a thermal phase shifter, a PIN diode modulator, a ring resonator, and the like. In one embodiment, optical summation/combination of the signals in block 104 is performed using a star coupler, a waveguide splitter, a directional coupler, and the like. In one embodiment, detection unit 106 is a photo-diode.

Figure 7:
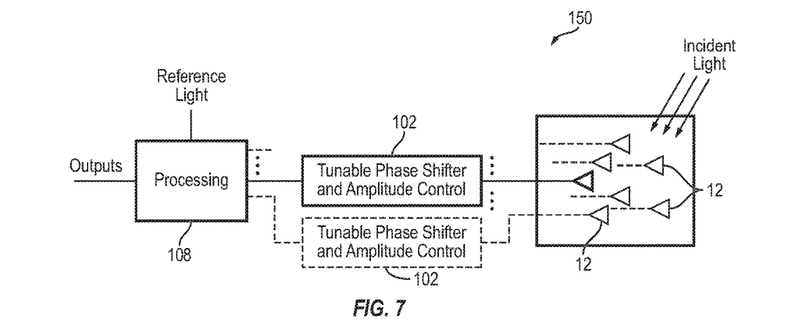
FIG. 7 is a high-level simplified block diagram of a number of components of a sparse optical phased array receiver, in accordance with one exemplary embodiment of the present invention.

In some embodiments, a reference light having a known relative phase and amplitude is used for processing of the received light. FIG. 7 is a high-level simplified block diagram of a sparse optical phased array receiver 150 adapted to process the received light and extract the desired information, such as the direction of the incident light, in accordance with another exemplary embodiment of the present invention. Phased array receiver 150 is similar to phased array receiver 100 except that phased array receiver 150 is further adapted to mix the optical signals received from blocks 102 with the reference light in processing block 108 to process the received signals and extract the desired information.

Figure 8:
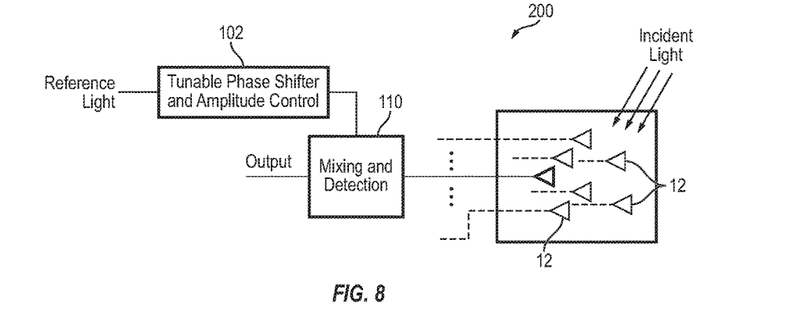
FIG. 8 is a high-level simplified block diagram of a number of components of a sparse optical phased array receiver, in accordance with one exemplary embodiment of the present invention.

FIG. 8 is a high-level simplified block diagram of a sparse optical phased array receiver 200 adapted to process the received light and extract the desired information, such as the direction of the incident light, in accordance with yet another exemplary embodiment of the present invention. In array 200, the optical signals received by the array elements 12 are supplied to mixing and detection block 110. Tunable phase shifter and amplitude control block 102 controls the phase and/or amplitude of the reference light and supplies the phase-shifted and/or amplitude modulated reference light to mixing and detection block 110. Mixing and detection unit 110 mixes the output signal of block 102 with the optical signals it receives from the array elements to generate a mixed signal which it subsequently converts to an electrical signal and supplies at its output terminal. The output of mixing and detection unit 110 represents the desired information, such as the direction or the intensity of the light incident on the receiver elements.

A sparse optical phased array transmitter, as described above in accordance with the embodiments of the present invention, includes an array of transmitting elements that transmit an optical signal in a given direction. Because a phased-array transmitter, in accordance with embodiments of the present invention, is sparsely populated with transmitting elements, the phased array transmitter has an enhanced performance compared to conventional phased-array transmitters. In accordance with the embodiments of the present invention, the locations of the transmitting elements within the transmitter aperture may selected so as to satisfy one or more performance characteristics such as beam width, side lobe level and etc.

Figure 9:
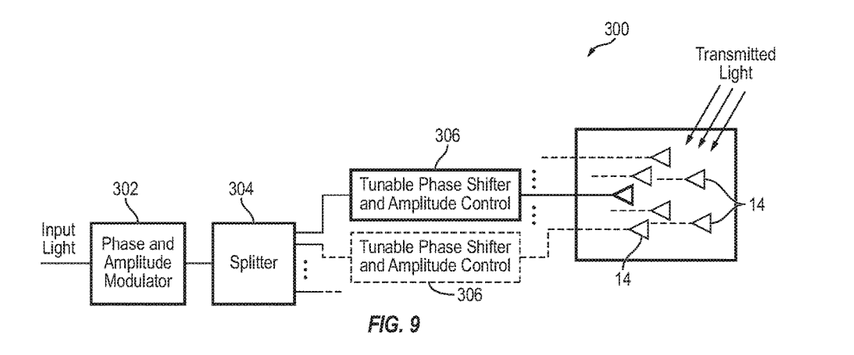
FIG. 9 is a high-level simplified block diagram of a number of components of a sparse optical phased array transmitter, in accordance with one exemplary embodiment of the present invention.

FIG. 9 is a high-level simplified block diagram of a number of components of a sparse optical phased array transmitter 300 adapted to transmit light in a selected direction, in accordance with one exemplary embodiment of the present invention. Phase and amplitude modulator block 302 is adapted to modulate the phase and/or amplitude of the input light. Splitter 304 is adapted to receive and split the phase and/or amplitude modulated input light into N optical signals (N is the number of transmitting elements) each delivered to a different one of N tunable phase shifter and amplitude control blocks 306. The output signal of each tunable phase shifter and amplitude control blocks 306 is delivered to an associated array transmitting element 14, as shown. By adjusting the phases and/or amplitudes of the signals via blocks 306, the direction of the waver-front of the light transmitted by the phased array transmitter 300 may be changed along a desired direction. Each transmitting element 14 may be a grating coupler, an electromagnetic diffractive mode coupler, an edge coupler, a plasmonic element, and the like. In this exemplary embodiment of the sparse phased array transmitter, it is assumed that there is a single layer available for routing of the optical signals. However, it is understood that more than one routing layer may be used for delivering the optical signals to the transmitting elements.

In a sparse transceiver array, the sparse transmitter array transmits light from the aperture and the sparse receiver array captures the light incident on the aperture. In one embodiment, sparse transmitter and receiver arrays operate independently. In one embodiment, using a communication protocol, the sparse transmitter array of a first transceiver communicates with a sparse receiver array of a second transceiver, and the sparse receiver array of the first transceiver communicates with the sparse transmitter array of the second transceiver.

In one embodiment, each array element of a transceiver is adapted to both receive and transmit light. In other words, the transmitter and the receiver share the sparse array of transmitting/receiving elements. In such embodiments, the transmitter and the receiver may coordinate their operations, or alternatively may operate independently from one another. In one embodiment, the transmitter and receiver, in addition to sharing the same array elements, also share phase and amplitude modulators. Because of the reciprocity of electromagnetic waves, in such embodiments, the transmitter may transmits light along the same direction from which the receiver may capture the light. In other words, both the transmitter and receiver may point to the same direction for transmitting and receiving light. This is advantageous in applications such as LiDAR, imaging and data communication.

Figure 10:
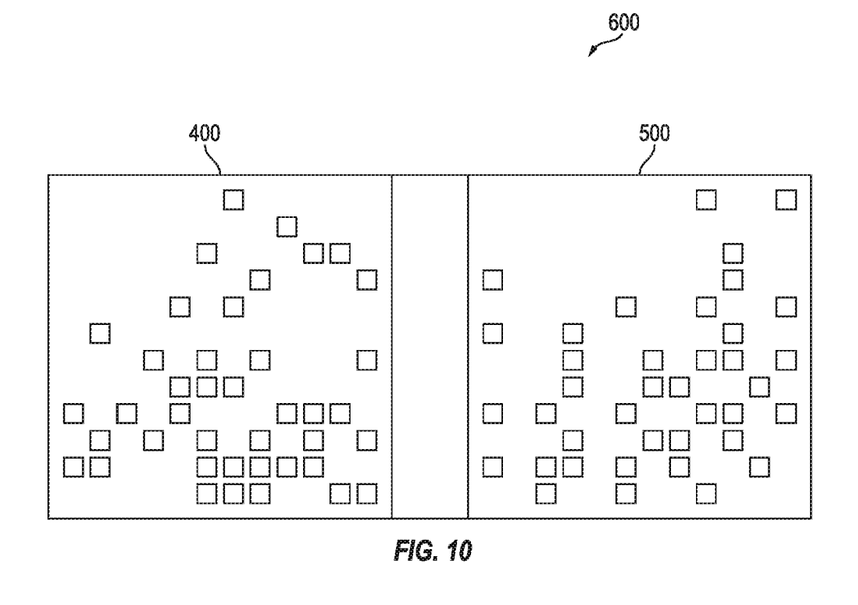
FIG. 10 is a schematic diagram of a co-sparse transceiver having disposed therein a sparse transmitter array and a sparse receiver array, in accordance with one exemplary embodiment of the present invention.

In one embodiment, the transmitter and receiver form a co-sparse array of a transceiver so as to enable the receiver to capture the light transmitted by the transmitter. FIG. 10 shows a co-sparse transceiver 600 that includes, in part, a sparse transmitter array 400, and a sparse receiver array 500. If, for example, the transmitter illuminates a point A with the gain of GT and the receiver captures the light arriving from point A with the gain of GR, the overall gain of the transceiver is GTGR. Therefore, the pattern of the transceiver which is the gain of the transceiver for all the points and directions it sends light to or receives light from, is the product of the pattern of the transmitter and the receiver. Because both the transmitter 400 and receiver 500 have sparse arrays, as described above, transceiver 600 benefits from extra degrees of freedom and a better performance. For example, if the transmitter has a large side lobe at a direction, but the receiver gain at that direction is small, the product of the two gains would be advantageously small. As a result, the transmitter (receiver) pattern could be relaxed for directions that fall in the low-gain pattern of the receiver (transmitter).

The above embodiments of the present invention are illustrative and not limitative. The embodiments of the present invention are not limited by the aperture size or the number of elements in a sparse array of transmitters or receivers. The above embodiments of the present invention are not limited by the modulation schemes used to modulate the phases or amplitudes of the optical signals. The above embodiments of the present invention are not limited by the wavelength of the light. The above embodiments of the present invention are not limited by the number of semiconductor substrates that may be used to form a sparse transmitter, receiver or transceiver array. Other modifications and variations will be apparent to those skilled in the art and are intended to fall within the scope of the appended claims.

What is claimed is:

1. A phased array receiver comprising at least first, second and third receiving elements disposed along a row, wherein said second receiving element is disposed between the first and third receiving elements, and wherein a distance between the first and second receiving elements is different than a distance between the second and third receiving elements, said phased array receiver further comprising:
   first, second and third phase shifters adapted to shift phases of an optical signal received respectively by the first, second and third receiving elements;
   first, second and third amplitude modulators adapted to modulate amplitudes of the optical signal received by the first, second and third receiving elements; and
   a combiner adapted to combine the phase-shifted and amplitude-modulated signals supplied by the first, second and third phase shifters and the first, second and third amplitude modulators to generate a combined signal.

2. The sparse optical phased array receiver of claim 1 further comprising:
   a photo-diode adapted to convert the combined signal to an electrical signal.

3. The sparse optical phased array receiver of claim 1 further comprising:
   a signal processing block adapted to receive and mix a reference optical signal with the combined signal.

4. The sparse optical phased array receiver of claim 3 further comprising:
   a phase shifter adapted to shift a phase of the reference optical signal.

5. The sparse optical phased array receiver of claim 4 further comprising:
   an amplitude modulator adapted to modulate an amplitude of the reference optical signal.

6. A method of detecting a direction of an incident optical signal, the method comprising:
   receiving the incident optical signal via at least first, second and third receiving elements disposed along a row, wherein said second receiving element is disposed between the first and third receiving elements, and wherein a distance between the first and second receiving elements is different than a distance between the second and third receiving elements;
   shifting phases of the optical signal received by the first, second and third receiving elements;
   modulating amplitudes of the optical signal received by the first, second and third receiving elements; and
   combining the first, second and third phase-shifted and amplitude-modulated optical signals to generate a combined signal.

7. The method of claim 6 further comprising:
   converting the combined signal to an electrical signal.

8. The method of claim 6 further comprising:
   mixing a reference optical signal with the combined signal.

9. The method of claim 8 further comprising:
   shifting a phase of the reference optical signal.

10. The method of claim 9 further comprising:
    modulating an amplitude of the reference optical signal.

11. A phased array receiver comprising at least first, second and third receiving elements disposed along a two-dimensional array characterized by at least three rows and at least three columns defining nine positions where the at least first, second and third receiving elements may be disposed, wherein the at least first, second and third receiving elements are distributed among the nine positions such at least one of the nine positions does not receive a receiving element, said phased array receiver further comprising:
    first, second and third phase shifters adapted to shift phases of an optical signal received respectively by the first, second and third receiving elements;
    first, second and third amplitude modulators adapted to modulate amplitudes of the optical signal received by the first, second and third receiving elements; and
    a combiner adapted to combine the phase-shifted and amplitude-modulated signals supplied by the first, second and third phase shifters and the first, second and third amplitude modulators to generate a combined signal.

12. The sparse optical phased array receiver of claim 11 further comprising:
    a photo-diode adapted to convert the combined signal to an electrical signal.

13. The sparse optical phased array receiver of claim 12 further comprising:
    a signal processing block adapted to receive and mix a reference optical signal with the combined signal.

14. The sparse optical phased array receiver of claim 13 further comprising:
    a phase shifter adapted to shift a phase of the reference optical signal.

15. The sparse optical phased array receiver of claim 14 further comprising:
    an amplitude modulator adapted to modulate an amplitude of the reference optical signal.

16. A method of detecting a direction of an incident optical signal, the method comprising:
    receiving the incident optical signal via at least first, second and third receiving elements disposed along a two-dimensional array characterized by at least three rows and at least three columns defining nine positions where the at least first, second and third receiving elements may be disposed, wherein the at least first, second and third receiving elements are distributed among the nine positions such at least one of the nine positions does not receive a receiving element;
    shifting phases of the optical signal received by the first, second and third receiving elements;

modulating amplitudes of the optical signals received by the first, second and third receiving elements; and combining the first, second and third phase-shifted and amplitude-modulated optical signals to generate a combined signal.

17. The method of claim 16 further comprising:
converting the combined signal to an electrical signal.

18. The method of claim 16 further comprising:
mixing a reference optical signal with the combined optical signal.

19. The method of claim 18 further comprising:
shifting a phase of the reference optical signal.

20. The method of claim 19 further comprising:
modulating an amplitude of the reference optical signal.

21. The sparse optical phased array receiver of claim 1 further comprising first, second and third photo-diodes adapted to respectively convert the first, second and third optical signals.

22. The sparse optical phased array receiver of claim 1 further comprising a signal processing block adapted to mix each of the first, second and third optical signals with a reference signal.

23. The method of claim 6 further comprising converting each of the first, second and third optical signals to an electrical signal.

24. The method of claim 6 further comprising:
mixing a reference optical signal with the optical signal received by the first, second and third receiving elements.

25. The sparse optical phased array receiver of claim 11 further comprising:
first, second and third photo-diodes adapted to respectively convert the optical signal received by the first, second and third receiving elements.

26. The sparse optical phased array receiver of claim 24 further comprising a signal processing block adapted to mix the optical signal received by the first, second and third receiving elements with a reference signal.

27. The sparse optical phased array receiver of claim 1 wherein the at least first, second and third receiving elements are positioned on-grid.

28. The sparse optical phased array receiver of claim 1 wherein the at least first, second and third receiving elements are positioned off-grid.

29. The method of claim 6 wherein the at least first, second and third receiving elements are positioned on-grid.

30. The method of claim 6 wherein the at least first, second and third receiving elements are positioned off-grid.

31. The sparse optical phased array receiver of claim 11 wherein the at least first, second and third receiving elements are positioned on-grid.

32. The sparse optical phased array receiver of claim 11 wherein the at least first, second and third receiving elements are positioned off-grid.

33. The sparse optical phased array receiver of claim 16 wherein the at least first, second and third receiving elements are positioned on-grid.

34. The sparse optical phased array receiver of claim 16 wherein the at least first, second and third receiving elements are positioned off-grid.

* * * * *